Patented Dec. 11, 1945

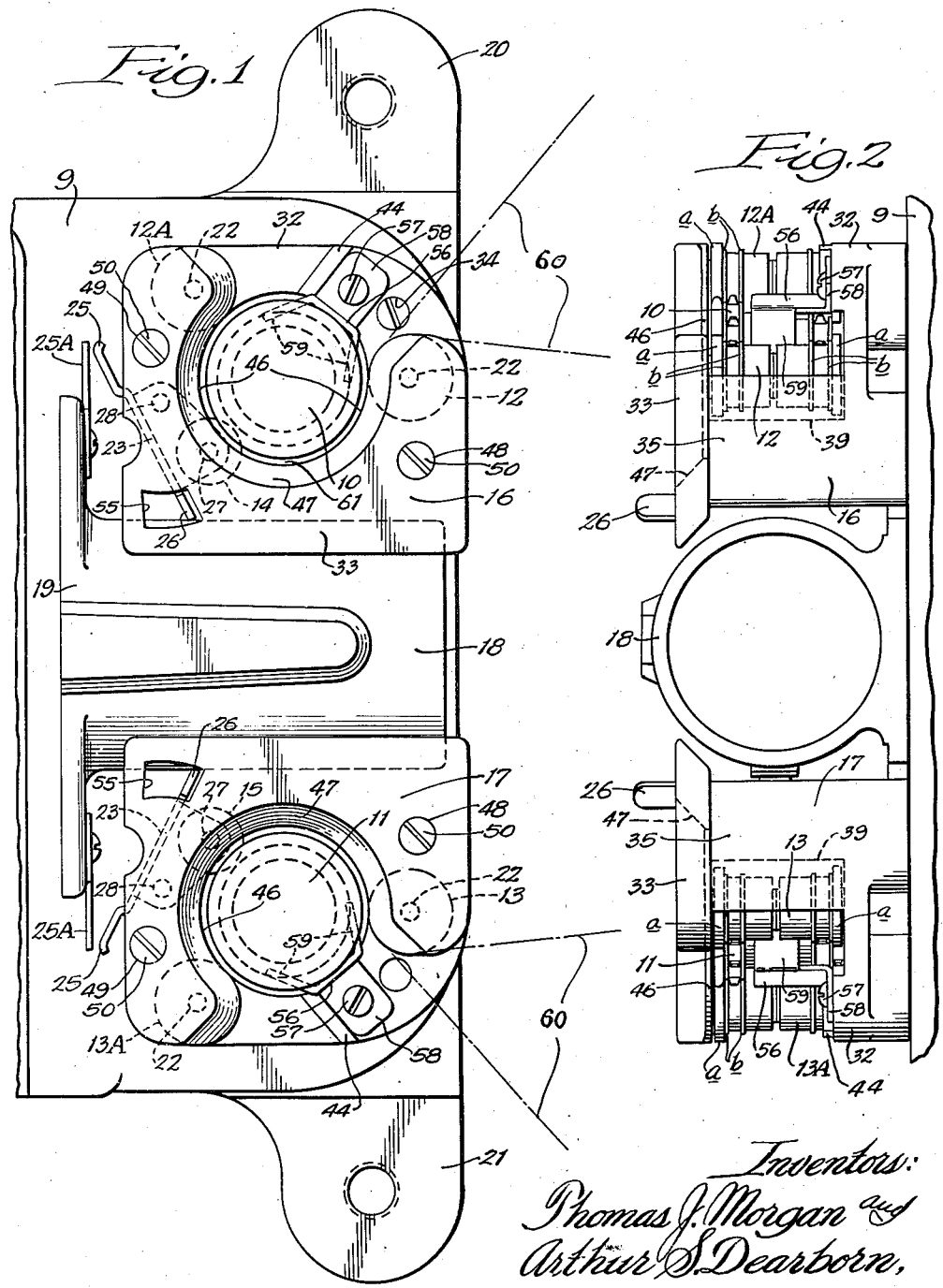

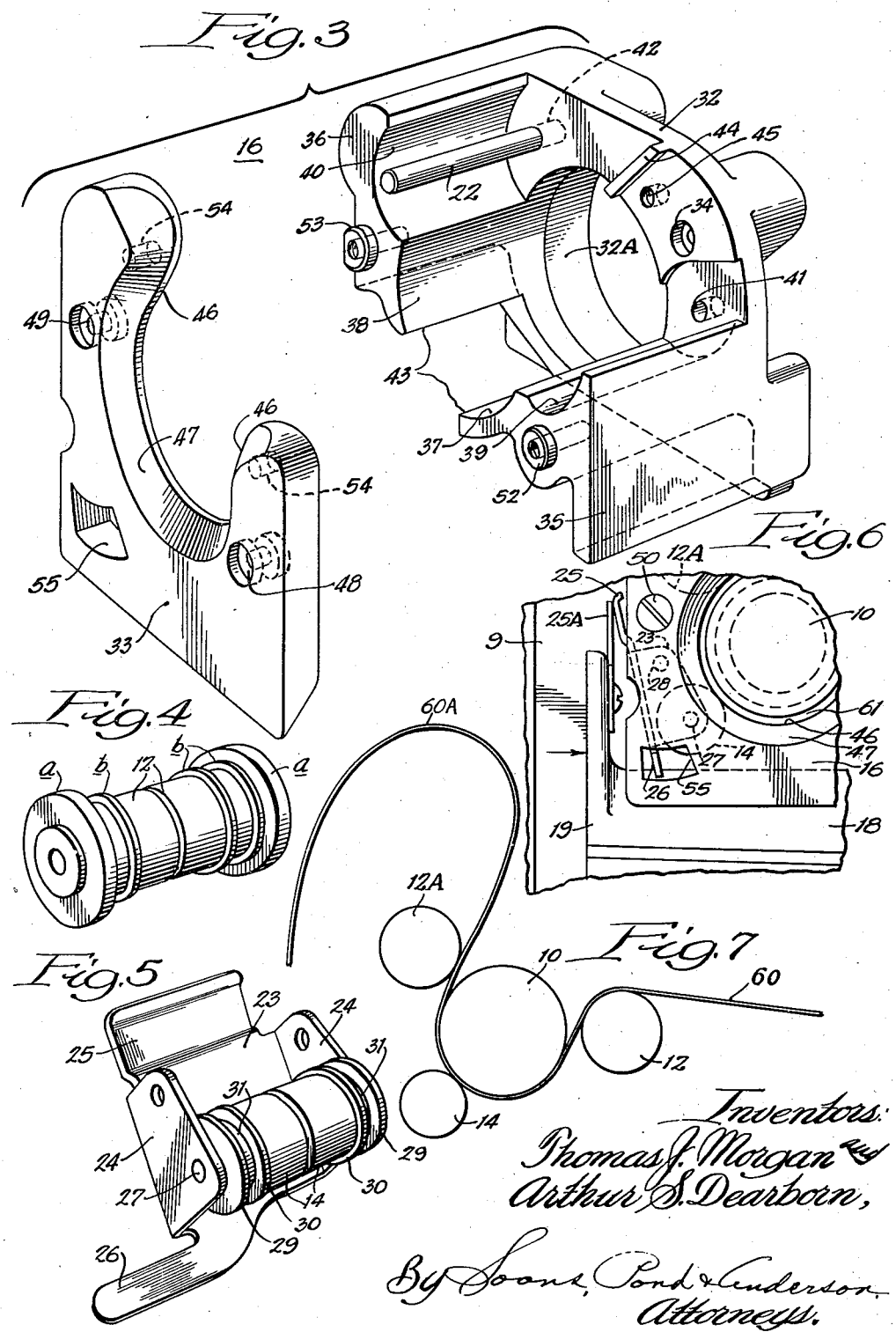

2,390,893

UNITED STATES PATENT OFFICE 2,390,893

FILM RETAINER FOR CINEMATOGRAPH SPROCKETS

Thomas J. Morgan, Chicago, and Arthur S. Dearborn, Hinsdale, Ill., assignors to Ampro Corporation, a corporation of Illinois Application February 17, 1943, Serial No. 476,150

10 Claims. (Cl. 271—2.3)

This invention relates to mechanism for retaining the film in proper operative relationship with the film-feed and take-up sprockets for motion picture cameras and projectors. Both types of machine are embraced in the designation "cinematograph."

In apparatus of this kind it is important that the threading of the film around the sprockets and through the film gate be accomplished with the greatest possible facility and certainty. To that end it is imperative that the sprocket holes in the film come immediately and positively into registration with the teeth on the sprocket so as to insure a snug contact of the film with the periphery of the sprocket. Also, it is important that the contact of the film and its guide and retaining mechanisms incur the least possible wear of the film.

The main objects of this invention are to provide a new and improved mechanism for positioning the film in proper operative relationship with the film sprockets of a cinematograph; to provide a film mechanism of this kind which permits the easy insertion of the film into and removal from its functional position with the sprockets; to provide a film retainer roller normally urged to engage the film against the sprocket periphery and automatically retractable with the opening of the film gate or manually retractable independent of the opening of the film gate; and to provide an improved mounting for supporting said film guide and retainer rollers on the cinematograph housing in functional relationship with the sprockets.

In the particular embodiment of this invention, illustrated in the accompanying drawings:

Fig. 1 is a side elevation of the forward portion of a cinematograph, showing this invention arranged in connection with both the feed and take-up sprockets;

Fig. 2 is a front elevation of the same;

Fig. 3 is a perspective showing in spaced relationship the two parts of the improved mounting for the rollers which co-act with the sprockets;

Fig. 4 is a perspective view of one of the two-part guide rollers used in this improved structure;

Fig. 5 is a perspective view of one of the retainer rollers as it is mounted on the lever arm whereby it is held in operative relationship with the film sprocket;

Fig. 6 is a fragmentary side elevation view showing the retainer roller shifted into its retracted position as a result of opening the film gate; and Fig. 7 is a diagrammatic view showing the functional relationship of the film with the sprocket and the co-acting guide and retainer rollers.

In the particular embodiment of the invention herein shown the forward portion of a cinematograph housing 9, provides the usual bearings (not shown) for the feed and take-up sprockets 10 and 11 with which are associated the respective pairs of guide rollers 12, 12A, 13, 13A and the film retainer rollers 14 and 15. These several rollers are supported in their respective positions within mountings 16 and 17 which are detachably supported on the cinematograph housing 9 concentrically of the sprockets 10 and 11.

The cinematograph housing 9 provides a support for the usual lens holder 18 and the shiftable film gate 19. In this particular embodiment these two parts are integral. At the forward upper corners of the housing are supporting lugs 20 and 21 to which are attached the usual film-reel supporting brackets, not shown herein since they do not directly form a part of this invention.

The feed sprocket 10 and take-up sprocket 11 are of the usual form, supported in suitable bearings (not shown) in the cinematograph housing 9 so as to protrude transversely outward in parallel relationship from the adjacent supporting frame or housing 9. These sprockets are located above and below the lens holder 18 and have the conventional arrangement of teeth as indicated in Fig. 2.

The guide rollers 12, 12A, 13 and 13A each comprise two identical parts placed end to end as shown in Fig. 4. Each part is formed with an annular end flange *a* between the two of which the film is guided to and from the sprockets. Inwardly adjacent the end flanges are a pair of spaced annular flanges *b* which provide a limited surface contact with the film during its movement over the rollers to and from the sprockets. As shown in Fig. 1, the rollers 12 and 13, are mounted forwardly of the respective sprockets 10 and 11 with their axes located in the same horizontal planes with said sprockets. The guide rollers 12A and 13A are mounted rearwardly of the respective sprockets 10 and 11 with their axes above and below the planes of the axes of the respective sprockets and rollers 12 and 13. These rollers are rotatably supported in the housings 16 and 17, by means of suitable bearing pins 22 indicated in dotted outline in Fig. 1, one of which is shown in position in Fig. 3.

The pins 22 are positioned so that each pair of rollers 12 and 12A and 13 and 13A occupy fixed positions relative to the corresponding sprockets and are spaced equal distances away from the peripheries of the sprockets, as is most clearly shown in Figure 7. This spacing is somewhat greater than the thickness of the usual film. Thus, the film is not held or pressed against the sprocket by means of the guide rollers 12 and 12A and 13 and 13A as has heretofore generally been done with comparable constructions. Rather, the resiliency of the film spanning the guide rollers and partially encircling the sprocket is relied upon in the first instance to hold the film in positive operative contact with the sprocket.

The film-retainer rollers 14 and 15 are provided to supplement and accentuate the resiliency of the film spanning the guide rollers 12 and 12A and 13 and 13A for holding the film in positive operative contact with the sprocket. These rollers are of identical construction, and are supported in their co-operative relationship with the sprockets 10 and 11 by means of arms 23. Each of these arms 23, as will be most clearly noted from Fig. 5, comprises a sheet metal stamping formed with a pair of outwardly disposed ears 24, a cam 25, and a finger 26. The ears 24 provide support for the pins 27 by which the rollers 14 and 15 are rotatably held in place, and also support for the pins 28 (see Fig. 1) by which the arm 23 are pivotally arranged in the mountings 16 and 17. Coiled springs of the conventional kind (not herein shown) encircle the pins 28 so as to automatically urge the rollers 14 and 15 into contact with the respective sprockets 10 and 11.

These rollers 14 and 15, it will be noted from Fig. 5, are made of two identical parts. Each of these parts has adjacent its end spaced annular rims or flanges 29 and 30, between which is an annular channel 31 (see Fig. 5). The rims or flanges 29 and 30 thus limit the area of contact of the retainer rollers with the film. The channels are disposed to receive the teeth on the film sprockets and provide clearance for sound track.

Such an arrangement of guide rollers spaced peripherally from the sprocket in cooperation with the intermediate retainer roller gives the greatest assurance of a constant and maximum operative engagement of the film with the sprocket with a minimum of film-wearing contact with these several parts.

As will be noted from Figure 7, the axes of the retainer rollers 14 and 15 are less than 180° from the axes of each of the guide rollers 12 and 12A and 13 and 13A, respectively. Therefore, the pressure of the retainer roller needs to be very slight. The span of the film between each of the guide rollers and the retainer roller being less than 180°, the resiliency of the film at each side of the retainer roller can be depended upon to keep the film in close operative engagement with the sprocket.

Trippers 25A (see Fig. 1) are mounted on the film gate 19 for co-action with the cams 25 on the retainer-roller arms 23. These trippers are positioned to engage the cams 25 when the film gate 19 is opened and shift the rollers 14 and 15 into retracted positions away from the sprockets 10 and 11. This clears the space around the sprockets to permit the insertion or removal of the film.

The mountings 16 and 17 are identical in their construction except for the reversed relation of the several elements to permit their appropriate positioning with the sprockets 10 and 11 above and below the lens holder 18. The construction of these mountings is best illustrated in Fig. 3, being a perspective view of the two parts slightly separated and having the rollers removed therefrom. The description of the one—upper mounting—will serve for both.

The mounting 16 comprises a base member 32 and a plate member 33. The base member 32 is bored at 32A to receive the sprocket 10 when said base member 32 is attached to the housing 9. Such attachment is effected by means of threaded bolts extending through counter-sunk holes, one of which is shown at 34. Extending axially outward from the base member 32 on substantially opposite sides of the bore 32A are a pair of projections 35 and 36 which afford support for the plate member 33 in spaced relationship to the back of the base member 32. These projections 35 and 36 are recessed at 37 and 38 concentrically of the bore 32A to receive the sprocket 10. Said projections 35 and 36 are also recessed at 39 and 40 eccentrically of the bore 32A to receive the rollers 12 and 12A, respectively.

The base member 32 is drilled at 41 and 42 to receive the bearing pins 22 (only one of which is shown in Fig. 3) for the rollers 12 and 12A. As will be noted best from Fig. 3, a recess at 43 separates the projections 35 and 36 and provides a suitable opening for receiving the roller 14 to permit its engagement against the film encircling the sprockets. The back of the base member is provided also with a shoulder 44 and a threaded hole 45 affording a rigid mounting for a film stripper hereinafter described.

The plate member 33 is formed with a radially disposed U-shaped recess 46 concentric with the bore 32A. In the case of the mounting 16 the radial disposition of this recess 46 is upwardly and outwardly, whereas with the mounting 17 it is outwardly and downwardly. This recess 46 provides an axial opening 61 at the outer end of the sprocket to permit the insertion and removal of the film from around the sprocket and between it and the guide rollers 12 and 12A and the retainer roller 14. To facilitate such insertion of the film the plate member 33 is bevelled at 47 adjacent to the recess 46. Diametrically opposed drill holes 48 and 49, counter-bored on both sides, provide for the attachment of the plate member to the base member by means of bolts 50 (see Fig. 1). The inner counter-boring of the holes 48 and 49 allows for the reception of the lugs 52 and 53 on the base member 32 whereby the plate member 33 is properly and rigidly positioned on the base member 32 to complete the mounting 16. The outer counter-boring of the holes 48 and 49 is made obviously to receive the heads of the bolts 50 so that they are flush with the face of plate member 33.

The plate member 33 also has drill holes 54 on the inner face thereof to receive the outer ends of the bearing pins 22 whereby they are rigidly fixed in position when the housing members are secured in their assembled relationship. A slot 55 slightly arc-shaped about the pivot pin 28 is formed in the plate member 33 at the inner corner opposite the recess 46, through which protrudes the finger 26 on said retainer-roller arm 23.

All film mechanisms of this kind require the protection of a film stripper. To that end a stripper 56 (see Figs. 1 and 2) is mounted on the base member 32 by means of a bolt 57 screwed into the drill hole 45. The shank 58 of the stripper 56 is thus held firmly against the shoulder 44 so that the oppositely disposed arms 59 are rigidly held in proper spaced relationship adjacent to the sprocket.

This improved mechanism has been designed especially to make extremely facile and certain the threading of the film around the sprockets 10 or its removal therefrom, and to more effectively insure the effective engagement of the film with those sprockets. It would be well, therefore, to explain briefly the operation of this mechanism.

The relation of the parts is most clearly illustrated in the diagrammatic view of Fig. 7. Here it will be seen how the film 60, enters over the guide roller 12, wraps itself around the sprocket 10 and exists over the roller 12A into a loop 60A as the film approaches the film gate 19. Upon leaving the film gate 19 the film 60 forms a similar loop below the film gate as an approach to the take-up sprocket 11. Here the film 60 enters over the guide roller 13A, wraps around the sprocket 11 and exits over the guide roller 13. The changing angle at which the film enters over the guide roller 12 and similarly leaves the guide roller 13 is indicated by the dotted lines in Fig. 1, representing the film in its relationship to the changing diameters of the film when wound upon the film reels.

The spring-actuated arms 23 normally press the retainer rollers 14 and 15 against the film to insure its peripheral contact with the respective sprockets 10 and 11. This peripheral contact is sufficient to have three teeth on the sprocket in constant engagement with the sprocket holes in the film.

When it is desired to thread the film around the sprockets, the operator retracts the film gate 19 by the usual retracting lever (not shown). This retraction of the film gate 19 shifts the trippers 25A into contact with the cams 25 of the arms 23. Thereupon the rollers 14 and 15 are retracted from across the opening 61 (see Fig. 1) thereby leaving an unobstructed space around each of the sprockets 10 and 11. The operator then has only to arc the film 59 and quickly slip it in through the opening 61 into engagement with the sprockets 10 and 11. Upon shifting the film gate 19 into its operating position, the trippers 25A disengage the cams 25 and release the arms 23 so that the rollers 14 and 15 are moved into position to retain the peripheral contact of the film on the sprockets 10 and 11. The machine is then ready for use.

When it is desired to remove the film the film gate 19 is retracted. The trippers 25A again engage the cams 25 and shift the rollers 14 and 15 away from the sprockets 10 and 11 so as to again completely clear the openings 61. This permits the film to be quickly withdrawn from around the sprockets.

If for any reason the operator wants to thread the film around either of the sprockets, or remove it without operating the film gate, it is only necessary to shift one or the other, or both of the rollers 14 and 15 away from their respective sprockets by means of the fingers 26.

Changes in the described construction may be made without departing from the spirit of the invention, the scope of which should be determined by reference to the following claims, the same being construed as broadly as possible consistent with the state of the art.

We claim:

1. The combination with a film sprocket of a pair of guide rollers both fixedly positioned on axes locating said rollers out of peripheral contact with said sprocket a distance greater than the thickness of a film and so adjacent to said sprocket that a line connecting their axes intersects said sprocket whereby a film spanning said rollers partially encircles said sprocket and is held in peripheral contact with said sprocket by the resilience of the film, and a film-retainer roller mounted intermediate said guide rollers and shiftable into and out of position to provide a single point of mechanically-induced contact of said film with said sprocket between said guide rollers.

2. The combination with a film sprocket of a pair of guide rollers both fixedly positioned on axes locating said rollers out of peripheral contact with said sprocket a distance greater than the thickness of a film and so adjacent to said sprocket that a line connecting their axes intersects said sprocket whereby a film spanning said rollers partially encircles said sprocket and is held in peripheral contact with said sprocket by the resiliency of the film, a film-retainer roller mounted intermediate said guide rollers and shiftable into and out of position to provide a single point of mechanically-induced contact of said film with said sprocket between said guide rollers, a pivotally mounted arm supporting said retainer roller, resilient means normally urging said arm to shift said roller into its film retaining position, and an axially disposed finger on said arm extending outwardly into position for engagement with an operator's hand to secure the retraction of said retainer roller during the threading or removal of said film from said sprocket.

3. The combination with a film sprocket rotatably supported in an axially extended position with regard to a cinematograph housing of a guide-roller mounting detachably supportable on said cinematograph housing concentrically of said sprocket, and a pair of film guide rollers journaled on said mounting eccentrically of said sprocket for holding a film spanned between said rollers in partial encirclement with said sprocket.

4. The combination with a film sprocket rotatably supported in an axially extended position with regard to a cinematograph housing of a guide-roller mounting detachably supportable on said cinematograph housing concentrically of said sprocket, a pair of film guide rollers journaled on said mounting eccentrically of said sprocket for holding a film spanned between said rollers in partial encirclement with said sprocket, and a film-retainer roller swingably supported in said guide roller mounting and normally urged into position to contact and press a film against said sprocket at a point between said guide rollers.

5. The combination with a film sprocket rotatably supported in an axially extended position with regard to a cinematograph housing of a guide-roller mounting detachably supportable on said cinematograph housing concentrically of said sprocket, said guide roller mounting being formed with a main central bore to receive said sprocket, a pair of guide roller bores eccentrically arranged with respect to said central bore, and guide rollers journaled in the respective eccentric bores by means of bearing pins secured to said mounting and positioned so that a film spanning said rollers is held in partial encirclement on said sprocket.

6. The combination with a film sprocket rotatably supported in an axially extended position with regard to a cinematograph housing of a guide-roller mounting detachably supportable on said cinematograph housing concentrically of said sprocket, said guide roller mounting being formed with a main central bore to receive said sprocket, a pair of guide roller bores eccentrically arranged with respect to said central bore, and guide rollers journaled in the respective eccentric bores by means of bearing pins secured to said mounting so as to position said rollers adjacent to but equidistant out of peripheral contact with said sprocket greater than the thickness of a film so as to provide a normally unobstructed annular space around said sprocket and whereby a film spanning said rollers partially encircles said sprocket and is held in peripheral contact with said sprocket by the resiliency of the film.

7. The combination with a film sprocket rotatably supported in an axially extended position with regard to a cinematograph housing of a guide-roller mounting detachably supportable on said cinematograph housing concentrically of said sprocket, said guide roller mounting being formed with a main central bore to receive said sprocket, a pair of guide roller bores eccentrically arranged with respect to said central bore, guide rollers journaled in the respective eccentric bores by means of bearing pins secured to said mounting and positioned so that a film spanning said rollers is held in partial encirclement on said sprocket, said guide roller mounting being recessed to provide a peripheral opening into said central bore between said eccentric bores, an arm swingably supported on said guide roller mounting, a film-retainer roller journaled on said arm, and means normally urging said arm to shift said film retainer roller through said mounting recess across said annular space to press a film into contact with said sprocket between said guide rollers.

8. The combination with a film sprocket rotatably supported in an axially extended position with regard to a cinematograph housing of a guide-roller mounting detachably supportable on said cinematograph housing concentrically of said sprocket, said guide roller mounting being formed with a main central bore to receive said sprocket, a pair of guide roller bores eccentrically arranged with respect to said central bore, guide rollers journaled in the respective eccentric bores by means of bearing pins secured to said mounting and positioned so that a film spanning said rollers is held in partial encirclement on said sprocket, said guide roller mounting being recessed to provide a peripheral opening into said central bore between said eccentric bores, an arm swingably supported on said guide roller mounting, a film-retainer roller journaled on said arm, means normally urging said arm to shift said film retainer roller through said mounting recess across said annular space to press a film into contact with said sprocket between said guide rollers, and an axially disposed finger on said arm extending out through said guide roller housing into position for engagement with an operator's hand to secure the retraction of said retainer roller during the threading or removal of said film.

9. The combination with a film sprocket rotatably supported in an axially extended position with regard to a cinematograph housing of a guide-roller mounting detachably supportable on said cinematograph housing concentrically of said sprocket, said guide roller mounting being formed with a main central bore to receive said sprocket, a pair of guide roller bores eccentrically arranged with respect to said central bore, and guide rollers journaled in the respective eccentric bores by means of bearing pins secured to said mounting and positioned so that the peripheries of the guide rollers are tangent to the periphery of the central bore thereby providing an annular unobstructed space between said sprocket and said guide rollers and mounting and whereby a film spanning said rollers partially encircles said sprocket and is held in peripheral contact with said sprocket by the resiliency of the film.

10. The combination with a film sprocket rotatably supported in an axially extended position with regard to a cinematograph housing of a guide-roller mounting detachably supportable on said cinematograph housing concentrically of said sprocket, said guide roller mounting being formed with a main central bore to receive said sprocket, a pair of guide roller bores eccentrically arranged with respect to said central bore, guide rollers journaled in the respective eccentric bores by means of bearing pins secured to said mounting and positioned so that the peripheries of the guide rollers are tangent to the periphery of the central bore thereby providing an annular unobstructed space between said sprocket and said guide rollers and mounting and whereby a film spanning said rollers partially encircles said sprocket and is held in peripheral contact with said sprocket by the resiliency of the film, and a film-retainer roller journaled on an arm swingably supported in said guide-roller mounting and normally shifted through said recess across said annular opening to press and hold a film in contact with said sprocket between said guide rollers.

THOMAS J. MORGAN.
ARTHUR S. DEARBORN.